United States Patent
Karaoguz et al.

(10) Patent No.: US 8,931,015 B2
(45) Date of Patent: Jan. 6, 2015

(54) SYSTEM AND METHOD FOR PROVIDING INFORMATION OF SELECTABLE OBJECTS IN A TELEVISION PROGRAM IN AN INFORMATION STREAM INDEPENDENT OF THE TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 340 days.

(21) Appl. No.: 12/881,004

(22) Filed: Sep. 13, 2010

(65) Prior Publication Data

US 2011/0067052 A1 Mar. 17, 2011

Related U.S. Application Data

(60) Provisional application No. 61/242,234, filed on Sep. 14, 2009.

(51) Int. Cl.
| | | |
|---|---|---|
| *G06F 13/00* | (2006.01) | |
| *G06F 3/00* | (2006.01) | |
| *H04N 5/445* | (2011.01) | |
| *H04N 21/422* | (2011.01) | |
| *H04N 21/433* | (2011.01) | |
| *G06F 3/03* | (2006.01) | |
| *H04N 21/2343* | (2011.01) | |
| *G06F 3/0346* | (2013.01) | |
| *H04N 21/4728* | (2011.01) | |
| *G06F 3/042* | (2006.01) | |
| *H04N 21/2389* | (2011.01) | |
| *G06F 3/038* | (2013.01) | |
| *H04N 21/845* | (2011.01) | |
| *H04N 21/432* | (2011.01) | |
| *H04N 21/4725* | (2011.01) | |
| *H04N 9/82* | (2006.01) | |
| *H04N 5/44* | (2011.01) | |
| *H04N 5/76* | (2006.01) | |

(52) U.S. Cl.
CPC ............ *G06F 3/0346* (2013.01); *H04N 9/8205* (2013.01); *H04N 2005/4432* (2013.01); *H04N 21/42204* (2013.01); *H04N 21/4334* (2013.01); *H04N 2005/4428* (2013.01); *G06F 3/0304* (2013.01); *H04N 21/234318* (2013.01); *H04N 21/4728* (2013.01); *G06F 3/0428* (2013.01); *H04N 21/23892* (2013.01); *H04N 5/76* (2013.01); *G06F 3/0386* (2013.01); *H04N 21/845* (2013.01); *H04N 21/4325* (2013.01); *H04N 21/4725* (2013.01); *G06F 3/0325* (2013.01)
USPC .................. 725/60; 725/32; 725/34; 725/40; 725/42; 725/51; 725/52; 725/61

(58) Field of Classification Search
USPC .................. 725/32, 34, 60, 40, 42, 51, 52, 61
See application file for complete search history.

(56) References Cited

U.S. PATENT DOCUMENTS

| | | | |
|---|---|---|---|
| 5,111,511 | A | 5/1992 | Ishii et al. |
| 5,408,258 | A | 4/1995 | Kolessar |

(Continued)

FOREIGN PATENT DOCUMENTS

| | | |
|---|---|---|
| CN | 1193869 A | 9/1998 |
| CN | WO 99/04559 A1 | 1/1999 |

(Continued)

OTHER PUBLICATIONS

Office Action from related U.S. Appl. No. 12/774,154 dated Dec. 5, 2012.

(Continued)

*Primary Examiner* — Mulugeta Mengesha
(74) *Attorney, Agent, or Firm* — Brinks Gilson & Lione

(57) ABSTRACT

A system and method for providing information of selectable objects in a television program in an information stream independent of the television program as shown in and/or described in connection with at least one of the figures, as set forth more completely in the claims.

30 Claims, 5 Drawing Sheets

(56) References Cited

U.S. PATENT DOCUMENTS

| | | |
|---|---|---|
| 5,543,851 A | 8/1996 | Chang |
| 5,602,568 A | 2/1997 | Kim |
| 5,708,845 A | 1/1998 | Wistendahl |
| 5,718,845 A | 2/1998 | Drost |
| 5,721,584 A | 2/1998 | Yoshinobu et al. |
| 5,727,141 A | 3/1998 | Hoddie |
| 5,793,361 A | 8/1998 | Kahn et al. |
| 5,929,849 A | 7/1999 | Kikinis |
| 6,097,441 A | 8/2000 | Allport |
| 6,122,660 A | 9/2000 | Baransky et al. |
| 6,133,911 A | 10/2000 | Kim |
| 6,255,961 B1 | 7/2001 | Van Ryzin et al. |
| 6,314,569 B1 | 11/2001 | Chernock et al. |
| 6,317,714 B1 | 11/2001 | Del Castillo et al. |
| 6,349,410 B1 | 2/2002 | Lortz |
| 6,407,779 B1 | 6/2002 | Herz |
| 6,538,672 B1 | 3/2003 | Dobbelaar |
| 6,931,660 B1 | 8/2005 | Kalluri et al. |
| 7,053,965 B1 | 5/2006 | Fan |
| 7,057,670 B2 | 6/2006 | Kikinis |
| 7,102,616 B1 | 9/2006 | Sleator |
| 7,158,676 B1 | 1/2007 | Rainsford |
| 7,301,530 B2 | 11/2007 | Lee et al. |
| 7,344,084 B2 | 3/2008 | DaCosta |
| 7,360,232 B2 | 4/2008 | Mitchell |
| 7,535,456 B2 | 5/2009 | Liberty |
| 7,536,706 B1 | 5/2009 | Sezan |
| 7,612,748 B2 | 11/2009 | Tateuchi |
| 7,631,338 B2 * | 12/2009 | Del Sesto et al. ............ 725/146 |
| 7,805,747 B2 | 9/2010 | Klappert |
| 7,827,577 B2 * | 11/2010 | Pack et al. .................... 725/52 |
| 7,889,175 B2 | 2/2011 | Kryze et al. |
| 7,890,380 B2 | 2/2011 | Stefanik |
| 7,987,478 B2 | 7/2011 | Minor |
| 8,068,781 B2 | 11/2011 | Ilan et al. |
| 8,095,423 B2 | 1/2012 | Nichols |
| 8,181,212 B2 | 5/2012 | Sigal |
| 8,223,136 B2 | 7/2012 | Hu et al. |
| 8,269,746 B2 | 9/2012 | Hodges et al. |
| 8,290,513 B2 | 10/2012 | Forstall et al. |
| 8,359,628 B2 | 1/2013 | Kitaru et al. |
| 8,421,746 B2 | 4/2013 | Igoe |
| 8,608,535 B2 | 12/2013 | Weston |
| 2001/0019368 A1 | 9/2001 | Holme et al. |
| 2001/0023436 A1 | 9/2001 | Srinivasan |
| 2001/0047298 A1 | 11/2001 | Moore |
| 2002/0040482 A1 | 4/2002 | Sextro |
| 2002/0042925 A1 | 4/2002 | Ebisu |
| 2002/0056136 A1 | 5/2002 | Wistendahl |
| 2002/0069405 A1 | 6/2002 | Chapin et al. |
| 2002/0078446 A1 | 6/2002 | Dakss |
| 2002/0090114 A1 | 7/2002 | Rhoads |
| 2002/0120934 A1 | 8/2002 | Abrahams |
| 2002/0136432 A1 | 9/2002 | Koike et al. |
| 2002/0162120 A1 | 10/2002 | Mitchell |
| 2003/0005445 A1 | 1/2003 | Schein |
| 2003/0023981 A1 | 1/2003 | Lemmons |
| 2003/0035075 A1 | 2/2003 | Butler et al. |
| 2003/0054878 A1 | 3/2003 | Benoy et al. |
| 2003/0115602 A1 | 6/2003 | Knee |
| 2003/0145326 A1 | 7/2003 | Gutta et al. |
| 2003/0212996 A1 | 11/2003 | Wolzien |
| 2003/0236752 A1 | 12/2003 | Dawson et al. |
| 2004/0078814 A1 * | 4/2004 | Allen ............................ 725/47 |
| 2004/0119701 A1 | 6/2004 | Mulligan et al. |
| 2004/0167855 A1 | 8/2004 | Cambridge |
| 2004/0236865 A1 | 11/2004 | Ullman |
| 2005/0028208 A1 | 2/2005 | Ellis |
| 2005/0086690 A1 | 4/2005 | Gilfix et al. |
| 2005/0132420 A1 | 6/2005 | Howard et al. |
| 2005/0137958 A1 * | 6/2005 | Huber et al. .................... 705/37 |
| 2005/0153687 A1 | 7/2005 | Niemenmaa et al. |
| 2005/0193425 A1 | 9/2005 | Sull et al. |
| 2005/0229227 A1 * | 10/2005 | Rogers ........................ 725/115 |
| 2005/0234782 A1 | 10/2005 | Schackne et al. |
| 2005/0251835 A1 | 11/2005 | Scott |
| 2005/0262542 A1 | 11/2005 | DeWeese et al. |
| 2006/0037044 A1 | 2/2006 | Daniels |
| 2006/0099964 A1 | 5/2006 | Barrese et al. |
| 2006/0174273 A1 | 8/2006 | Park |
| 2006/0195878 A1 | 8/2006 | Pack et al. |
| 2006/0241864 A1 | 10/2006 | Rosenberg |
| 2006/0259930 A1 | 11/2006 | Rothschild |
| 2006/0268895 A1 | 11/2006 | Kotzin |
| 2006/0282847 A1 | 12/2006 | Gupte |
| 2007/0097275 A1 | 5/2007 | Dresti et al. |
| 2007/0130581 A1 | 6/2007 | Del Sesto et al. |
| 2007/0156521 A1 * | 7/2007 | Yates ............................ 705/14 |
| 2007/0157260 A1 | 7/2007 | Walker |
| 2007/0195205 A1 | 8/2007 | Lowe |
| 2007/0199014 A1 | 8/2007 | Clark et al. |
| 2007/0266406 A1 | 11/2007 | Aravamudan |
| 2007/0277201 A1 | 11/2007 | Wong |
| 2007/0300263 A1 | 12/2007 | Barton |
| 2008/0052750 A1 | 2/2008 | Grunnet-Jepsen |
| 2008/0066097 A1 | 3/2008 | Park et al. |
| 2008/0066129 A1 * | 3/2008 | Katcher et al. ................ 725/109 |
| 2008/0109851 A1 | 5/2008 | Heather |
| 2008/0136754 A1 | 6/2008 | Tsuzaki et al. |
| 2008/0172693 A1 | 7/2008 | Ludvig |
| 2008/0204603 A1 | 8/2008 | Hattori |
| 2008/0204605 A1 | 8/2008 | Tsai |
| 2008/0209480 A1 | 8/2008 | Eide |
| 2009/0021473 A1 | 1/2009 | Grant et al. |
| 1009/0037947 | 2/2009 | Patil |
| 2009/0083815 A1 | 3/2009 | McMaster et al. |
| 2009/0113475 A1 | 4/2009 | Li |
| 2009/0165041 A1 * | 6/2009 | Penberthy et al. ............... 725/34 |
| 2009/0165048 A1 | 6/2009 | Nishimura |
| 2009/0187862 A1 | 7/2009 | DaCosta |
| 1009/0217317 | 8/2009 | Alao et al. |
| 2009/0217317 A1 | 8/2009 | White |
| 2009/0235312 A1 | 9/2009 | Morad |
| 2009/0237572 A1 | 9/2009 | Kishimoto |
| 2009/0271815 A1 * | 10/2009 | Contin et al. .................... 725/31 |
| 2009/0327894 A1 | 12/2009 | Rakib et al. |
| 2010/0064320 A1 | 3/2010 | Angiolillo et al. |
| 2010/0098074 A1 | 4/2010 | Kokernak |
| 2010/0157152 A1 | 6/2010 | Weitbruch et al. |
| 2010/0162303 A1 | 6/2010 | Cassanova |
| 2010/0218228 A1 | 8/2010 | Walter |
| 2011/0063523 A1 | 3/2011 | Karaoguz et al. |
| 2011/0066929 A1 | 3/2011 | Karaoguz et al. |
| 2011/0067062 A1 | 3/2011 | Karaoguz et al. |
| 2011/0067063 A1 | 3/2011 | Karaoguz et al. |
| 2011/0067064 A1 | 3/2011 | Karaoguz et al. |
| 2011/0067069 A1 | 3/2011 | Karaoguz et al. |
| 2011/0179435 A1 | 7/2011 | Cordray |
| 2012/0079525 A1 | 3/2012 | Ellis |
| 2012/0154268 A1 | 6/2012 | Alten |
| 2012/0163776 A1 | 6/2012 | Hassell et al. |

FOREIGN PATENT DOCUMENTS

| | | |
|---|---|---|
| CN | 1300501 A | 6/2001 |
| CN | 1329796 A | 1/2002 |
| WO | 2007/137611 A1 | 12/2007 |
| WO | WO 2007/137611 | 12/2007 |

OTHER PUBLICATIONS

Final Office Action from related U.S. Appl. No. 12/880,530 dated Jan. 14, 2013.

Final Office Action from related U.S. Appl. No. 12/880,594 dated Nov. 28, 2012.

Office Action from related U.S. Appl. No. 12/880,668 dated Jan. 2, 2013.

Final Office Action from related U.S. Appl. No. 12/881,096 dated Jan. 23, 2013.

Final Office Action from related U.S. Appl. No. 12/880,749 dated Feb. 1, 2013.

Final Office Action from related U.S. Appl. No. 12/880,888 dated Dec. 6, 2012.

(56) References Cited

OTHER PUBLICATIONS

Office Action from related U.S. Appl. No. 12/774,380 dated Jan. 8, 2013.
Final Office Action from related U.S. Appl No. 12/880,965 dated Jan. 11, 2013.
Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Office Action from related U.S. Appl. No. 12/850,866 dated Oct. 4, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Final Office Action from related U.S. Appl. No. 12/774,321 dated Jun. 27, 2013.
Non-Final Office Action from related U.S. Appl. No. 12/774,154 dated Aug. 14, 2013.
Non-Final Office Action from related U.S. Appl. No. 12/850,945 dated Aug. 27, 2013.
Non-Final Office Action from related U.S. Appl. No. 12/880,668 dated Jun. 10, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Final Office Action from related U.S. Appl. No. 12/774,154 dated Apr. 10, 2013.
Final Office Action from related U.S. Appl. No. 12/851,036 dated Feb. 26, 2013.
Final Office Action from related U.S. Appl. No. 12/851,075 dated Mar. 5, 2013.
Non-Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/850,945 dated Apr. 26, 2013.
Office Action from related U.S. Appl. No. 12/880,530 dated Aug. 2, 2012.
Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Non-Final Office Action from related U.S. Appl. No. 12/774,221 dated Sep. 20, 2013.
Non-Final Office Action from related U.S. Appl. No. 12/880,749 dated Oct. 4, 2013.
Non-Final Office Action from related U.S. Appl. No. 12/880,594 dated Oct. 22, 2013.
Final Office Action from related U.S. Appl. No. 12/880,668 dated Nov. 26, 2013.
Non-Final Office Action from related U.S. Appl. No. 12/880,888 dated Nov. 4, 2013.
Final Office Action from related U.S. Appl. No. 12/850,945 dated Dec. 16, 2013.
Final Office Action from related U.S. Appl. No. 12/774,154 dated Feb. 27, 2014.
Final Office Action from related U.S. Appl. No. 12/881,031 dated Mar. 6, 2014.
Final Office Action from related U.S. Appl. No. 12/880,749 dated Mar. 13, 2014.
Final Office Action from related U.S. Appl. No. 12/774,221 dated Jan. 29, 2014.
Final Office Action from related U.S. Appl. No. 12/880,851 dated Feb. 12, 2014.
Non-Final Office Action from related U.S. Appl. No. 12/774,321 dated Feb. 7, 2014.
Non-Final Office Action from related U.S. Appl. No. 12/850,832 dated Mar. 24, 2014.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/880,530 dated Apr. 9, 2014.
Non-Final Office Action from related U.S. Appl. No. 12/774,380 dated Apr. 15, 2014.
Non-Final Office Action from related U.S. Appl. No. 12/881,067 dated May 9, 2014.
Final Office Action from related U.S. Appl. No. 12/881,031 dated Jul. 25, 2014.
Final Office Action from related U.S. Appl. No. 12/880,530 dated Aug. 18, 2014.
Non-Final Office Action from related U.S. Appl. No. 12/880,749 dated Jul. 30, 2014.
Non-Final Office Action from related U.S. Appl. No. 12/850,866 dated Aug. 14, 2014.
Non-Final Office Action from related U.S. Appl. No. 12/859,911 dated Aug. 14, 2014.
Non-Final Office Action from related U.S. Appl. No. 12/850,945 dated Jul. 25, 2014.

* cited by examiner

SYSTEM AND METHOD FOR PROVIDING INFORMATION OF SELECTABLE OBJECTS IN A TELEVISION PROGRAM IN AN INFORMATION STREAM INDEPENDENT OF THE TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/880,965, filed concurrently herewith, titled "SYSTEM AND METHOD FOR PROVIDING INFORMATION OF SELECTABLE OBJECTS IN A TELEVISION PROGRAM"; and U.S. patent application Ser. No. 12/881,031, filed concurrently herewith, titled "SYSTEM AND METHOD FOR PROVIDING INFORMATION OF SELECTABLE OBJECTS IN A STILL IMAGE FILE AND/OR DATA STRAM". This patent application is further related to U.S. patent application Ser. No. 12/774,380, filed May 5, 2010, titled "SYSTEM AND METHOD IN A TELEVISION FOR PROVIDING USER-SELECTION OF OBJECTS IN A TELEVISION PROGRAM"; U.S. patent application Ser. No. 12/850,832, filed Aug. 5, 2010, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed Aug. 5, 2010, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/850,945, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,036, filed Aug. 5, 2010, titled "SYSTEM AND METHOD IN A TELEVISION SYSTEM FOR PROVIDING USER-SELECTION OF OBJECTS IN A TELEVISION PROGRAM"; U.S. patent application Ser. No. 12/851,075, filed Aug. 5, 2010, titled "SYSTEM AND METHOD IN A PARALLEL TELEVISION SYSTEM FOR PROVIDING USER-SELECTION OF OBJECTS IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of providing for and/or conveniently providing for user-selection of objects in a television program. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing information of selectable objects in a television program in an information stream independent of the television program, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
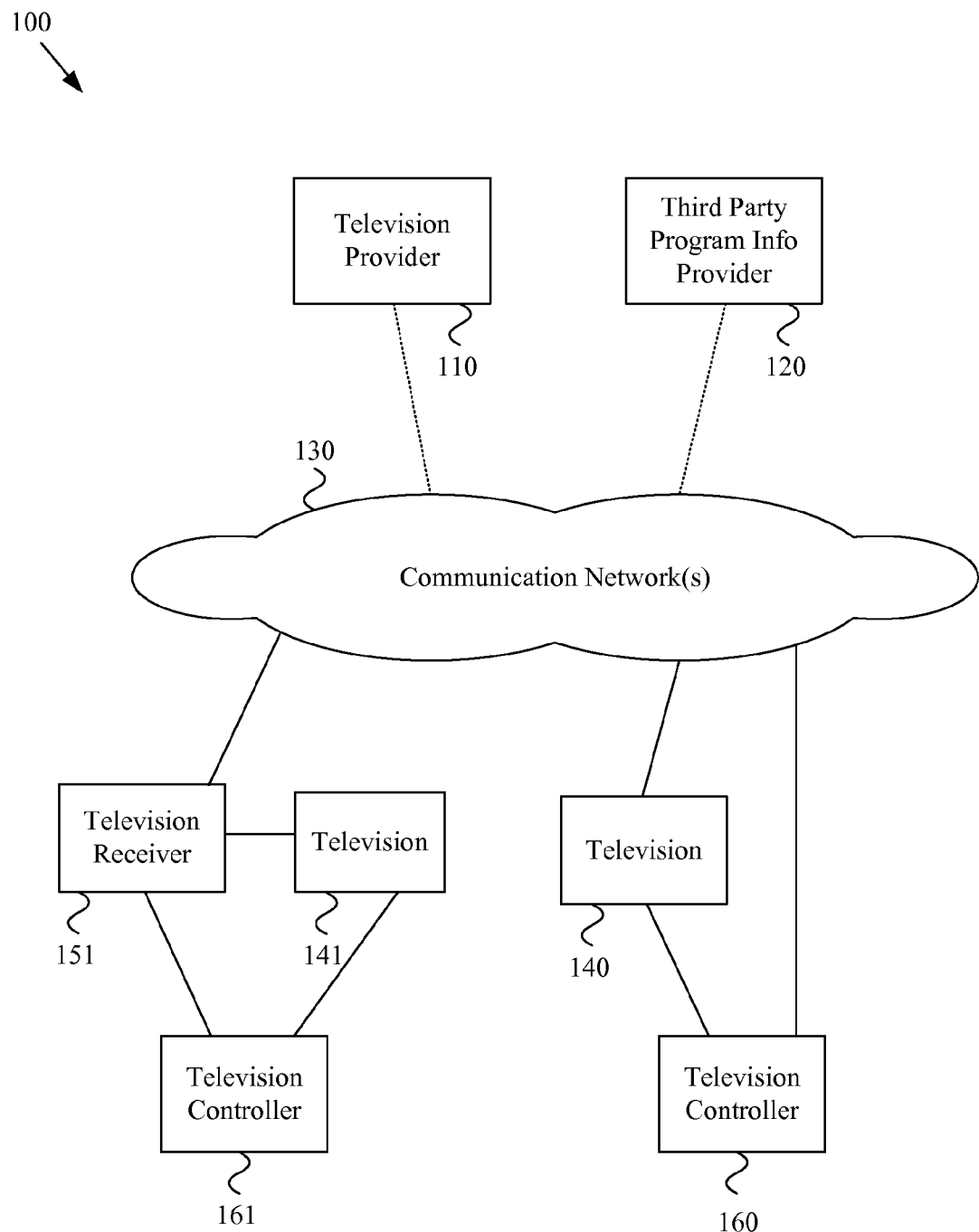
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television modules, television receiver modules, television controller modules, modules of a user's local television system, modules of a geographically distributed television system, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software submodules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), a general data communication network (e.g., the Internet), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion may at times refer to an on-screen pointing location. Such a pointing location refers to a location on the television screen (e.g., a primary television screen, a secondary television screen, etc.) to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television program source system and/or television program distribution system, comprise embedding information in a television program, where such information describes various aspects of user-selectable objects in the television program. Various aspects of the present invention may also, for example in a television, comprise receiving television programming, presenting such received television programming to a user, determining an on-screen pointing location pointed to by the user and processing information of user-selectable objects embedded in the received television programming to identify a user-selected object in the television programming and/or associated actions.

Also, the following discussion will at times refer to user-selectable objects in television programming. Such user-selectable objects comprise both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., clothing, automobiles, shoes, jewelry, furniture, food, beverages, appliances, electronics, toys, artwork, cosmetics, recreational vehicles, sports equipment, safety equipment, computer equipment, communication devices, books, etc.), premises objects (e.g., business locations, stores, hotels, signs, doors, buildings, landmarks, historical sites, entertainment venues, hospitals, government buildings, etc.), objects related to services (e.g., objects related to transportation, objects related to emergency services, objects related to general government services, objects related to entertainment services, objects related to food and/or drink services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reports, analysts, hosts/hostesses, entertainers, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides television programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in programming, etc.). As will be discussed below in more detail, the television provider 110 may operate to create a television program (or television program data set, television program data stream, moving picture information, etc.). The television provider 110 may also, for example, operate to form and/or communicate a user-selectable object data set that includes information of user-selectable objects in the television program. Such a user-selectable object data set for a television program may, for example, be independent of a data set that generally represents the television program (e.g., without information of user-selectable objects in such television program). For example and without limitation, such a television provider 110 may operate to receive a completed television program data set (e.g., a data file or other finite group of data, a data stream, etc.), for example via a communication network and/or on a physical medium, and form the user-selectable object data set independent of the completed television program data set. Also for example, such a television provider 110 may operate to form both the television program data set and form the user-selectable object data set.

The exemplary television system 100 may also include a third party program information provider 120. Such a provider may, for example, provide information related to a television program. Such information may, for example, comprise information describing user-selectable objects in programming, program guide information, etc. As will be discussed below in more detail, such a third party program information provider (e.g., a party independent of a television program source, television program network operator, etc.) may operate to form and/or communicate a user-selectable object data set that includes information of user-selectable objects in a television program. Such a user-selectable object data set for a television program may, for example, be independent of a data set that generally represents the television program (e.g., without information of user-selectable objects in such television program). Such a user-selectable object data set may also be communicated independently of a television program data set generally representing the television program. For example and without limitation, such a third party program information provider 120 may operate to receive a completed television program (e.g., a data file, a data stream, etc.), for example via a communication network and/or on a physical media, form a user-selectable object data set comprising user-selectable object information, where the user-selectable object data set is independent of the television program, and communicate such user-selectable object data set to a user's local television system independently of the communication of the television program to the user's local television system.

The exemplary television system 100 may include one or more communication networks (e.g., the communication network(s) 130). The exemplary communication network 130 may comprise characteristics of any of a variety of types of communication networks over which television programming and/or information related to television programming (e.g., information related to user-selectable objects in television programming) may be communicated. For example and without limitation, the communication network 130 may comprise characteristics of any one or more of: a cable television network, a satellite television network, a telecommunication network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.). The first television 140 may, for example, operate to (which includes "operate when enabled to") perform any or all of the functionality discussed herein. The first television 140 may, for example, operate to receive and process television program information and/or user-selectable object information (e.g., via one or more communication networks, stored on a physical medium or computer readable medium, etc.), where such user-selectable object information and such television program information are communicated independently.

The exemplary television system 100 may include a first television controller 160. Such a first television controller 160 may, for example, operate to (e.g., which may include "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, etc.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing information with the first television 140 and/or other devices. Also, as will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

Additionally, for example in a scenario in which the first television controller 160 comprises an on-board display, the first television controller 160 may operate to receive and process television program information and user-selectable object information (e.g., via one or more communication networks, stored on a physical medium or computer readable medium, etc.), where such user-selectable object information and such television program information are communicated independently.

As will be mentioned throughout the following discussion, various aspects of the invention will be performed by one or more devices, components and/or modules of a user's local television system. The first television 140 and first television controller 160 provide a non-limiting example of a user's local television system. Such a user's local television system, for example, generally refers to the television-related devices that are local to the television system currently being utilized by the user. For example, when a user is utilizing a television system located at the user's home, the user's local television system generally refers to the television-related devices that make up the user's home television system. Also for example, when a user is utilizing a television system at a premises away from the user's home (e.g., at another home, at a hotel, at an office, etc.), the user's local television system generally refers to the television-related devices that make up the premises television system Such a user's local television system does not, for example, comprise television network infrastructure devices that are generally outside of the user's current premises (e.g., cable and/or satellite head-end apparatus, cable and/or satellite communication intermediate communication network nodes) and/or programming source devices that are generally managed by television enterprises and generally exist outside of the user's home. Such entities, which may be communicatively coupled to the user's local television system, may be considered to be entities remote from the user's local television system (or "remote entities").

The exemplary television system 100 may also include a television receiver 151. The television receiver 151 may, for example, operate to (e.g., which may include "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.).

Additionally, for example in a scenario in which the television receiver 151 comprises an on-board display and/or provides audio/video information to a television communicatively coupled thereto, the television receiver 151 may operate to receive and process television program information and/or information of user-selectable objects in television programming (e.g., via one or more communication networks, stored on a physical medium or computer readable medium, etc.), where such user-selectable object information and such television program information are communicated independently.

The exemplary television system 100 may include a second television controller 161. Such a second television controller 161 may, for example, operate to (e.g., which may include "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.).

As will be discussed in more detail later, various aspects of the present invention include a user selecting a user-selectable object in programming. Such selection may, for example, comprise the user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location. Also, in a scenario in which the second television controller 161 comprises a touch screen, a user may touch a location of such touch screen to point to an on-screen location (e.g., to select a user-selectable object).

As will be mentioned throughout the following discussion, and as mentioned previously in the discussion of the first television 140 and television controller 160, various aspects of the invention will be performed by one or more devices, components and/or modules of a user's local television system. The second television 141, television receiver 151 and second television controller 161 provide another non-limiting example of a user's local television system.

Additionally, for example in a scenario in which the second television controller 161 comprises an on-board display, the second television controller 161 may operate to receive and process television program information and/or information of user-selectable objects in television programming (e.g., via one or more communication networks, stored on a physical medium or computer readable medium, etc.), where such user-selectable object information and such television program information are communicated independently.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
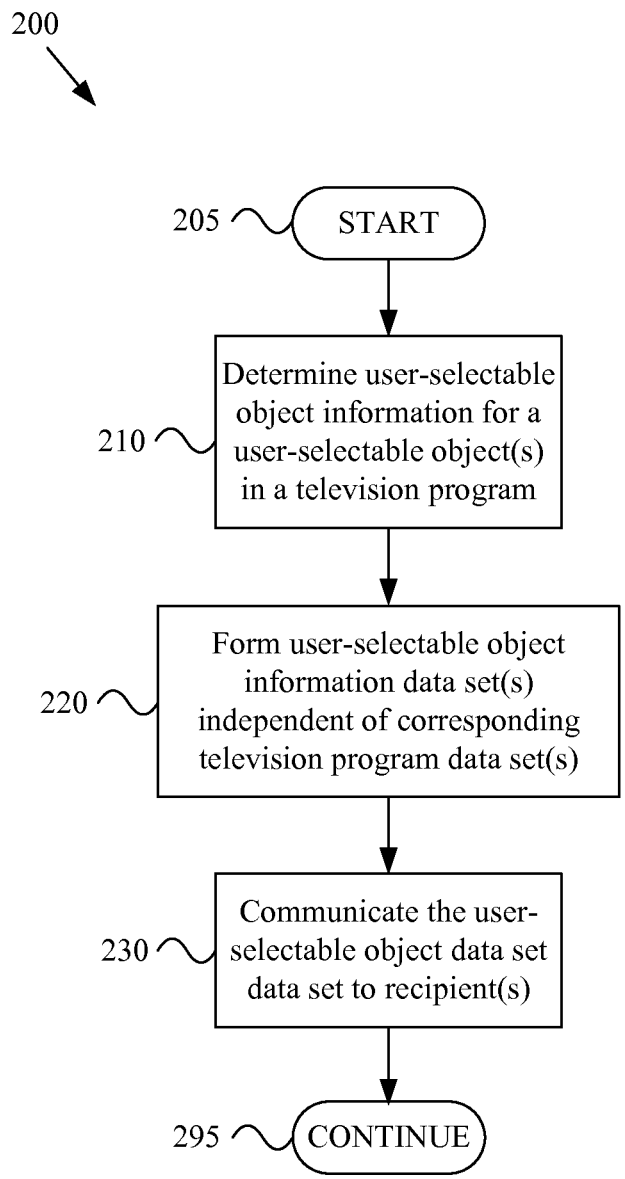
FIG. 2 is a flow diagram illustrating an exemplary method for providing information of selectable objects in a television program in an information stream independent of the television program, in accordance with various aspects of the present invention.

FIG. 2 is a flow diagram illustrating an exemplary method 200 for providing information of selectable objects in a television program, in accordance with various aspects of the present invention. Any or all aspects of the exemplary method 200 may, for example, be implemented in a television system component (e.g., the television provider 110, third party program information provider 120, a component of a communication network 130, first television 140, first television controller 160, second television 141, television receiver 151, second television controller 161, shown in FIG. 1 and discussed previously) and/or a plurality of such television system components operating in conjunction. For example, any or all aspects of the exemplary method 200 may be implemented in one or more television system components remote from the user's local television system. Also for example, any or all aspects of the exemplary method 200 may be implemented in one or more components of the user's local television system.

The exemplary method 200 may, for example, begin executing at step 205. The exemplary method 200 may begin executing in response to any of a variety of causes and/or conditions, non-limiting examples of which will now be provided. For example, the exemplary method 200 may begin executing in response to a user command to begin (e.g., a user at a television program source, a user at a television production studio, a user at a television distribution enterprise, etc.), in response to television program information and/or information of user-selectable objects in a television program arriving at a system entity implementing the method 200, in response to an electronic request communicated from the external entity to a system entity implementing the method 200, in response to a timer, in response to a request from an end user and/or a component of a user's local television system for a television program including information of user-selectable objects, in response to a request from a user for a television program where such user is associated in a database with television programming comprising user-selectable objects, upon reset and/or power-up of a system component implementing the exemplary method 200, in response to identification of a user and/or user equipment for which object selection capability is to be provided, in response to user payment of a fee, etc.

The exemplary method 200 may, for example at step 210, comprise determining user-selectable object information corresponding to one or more user-selectable objects in a television program. Such determining may comprise characteristics of any of a variety of manners of determining user-selectable object information, non-limiting examples of which will now be provided.

Step 210 may comprise receiving the user-selectable object information from any of a variety of sources, non-limiting examples of which will now be provided. For example and without limitation, step 210 may comprise receiving the user-selectable object information from a television broadcasting company, from a movie streaming company, from a television studio, from a television program database or server, from an advertising company, from a commercial enterprise associated with a user-selectable object in a television program, from a person or organization associated with a user-selectable object in a television program, from an Internet television programming provider, from a third party television program information source, etc.

Step 210 may comprise receiving the user-selectable object information from a plurality of independent sources. For example, in an exemplary scenario in which a television program includes user-selectable objects corresponding to a plurality of respective interested parties (e.g., respective product sponsors, respective leagues or other associations, respective people, etc.), step 210 may comprise receiving the user-selectable object information from each of such respective interested parties. For example, step 210 may comprise receiving user-selectable object information corresponding to a user-selectable consumer good in a television program from a provider of such consumer good, receiving user-selectable object information corresponding to an entertainer in the television program from the entertainer's management company, receiving user-selectable object information corresponding to a user-selectable historical landmark in the television program from a society associated with the historical landmark, receiving user-selectable object information corresponding to a user-selectable object in the television program associated with a service from a provider of such service, etc. In such a multiple-source scenario, step 210 may comprise aggregating the user-selectable object information received from the plurality of sources (e.g., into a single user-selectable object data set).

Step 210 may, for example, comprise receiving the user-selectable object information from a same source as that from which corresponding television program information (e.g., moving picture information) is received (e.g., received at step 210 or an earlier step) or may comprise receiving the user-selectable object information from a different source. For example and without limitation, step 210 may comprise receiving the user-selectable object information from an advertising company, while television program information is received from a television studio. In another example, step 210 may comprise receiving the user-selectable object information from a commercial enterprise associated with a consumer good object presented in the television program, while the television program information is received from a head-end server of a sports network.

In yet another example, step 210 may comprise receiving the user-selectable object information directly from a computer process that generates such information. For example, an operator may play a television program (e.g., at a normal rate, a slower-than-normal rate, frame-by-frame, etc.) and utilize graphical tools (e.g., boxes or other polygons, edge detection routines, etc.) to define and track movement of a user-selectable object in the television program. Such a computer process may then output information describing the user-selectable object and/or movement thereof in the television program. Step 210 may comprise performing such a process and/or receiving the information of user-selectable objects output from such process.

Step 210 may comprise receiving the user-selectable object information via any of a variety of types of communication networks. Such networks may, for example, comprise a wireless television network (e.g., terrestrial and/or satellite) and/or cable television network. Such networks may, for example, comprise any of variety of general data communication networks (e.g., the Internet, a local area network, a personal area network, a metropolitan area network, etc.).

Step 210 may, for example, comprise receiving the user-selectable object information via a same communication network as that via which a television program is received, receiving the user-selectable object information via a different communication network as that via which a television program is received, or receiving the user-selectable object information but not the television program. For example and without limitation, in a scenario in which a system implementing the method 200 receives both user-selectable object information and television program information, step 210 may comprise receiving the user-selectable object information via a general data communication network (e.g., the Internet), while the television program information is received via a television network. In another example, step 210 may comprise receiving the user-selectable object information via a general data network, while television program information is received from a computer readable medium.

Step 210 may comprise receiving the user-selectable object information from any of a variety of types of hard media (e.g., optical storage media, magnetic storage media, etc.). Such hard media may, for example, comprise characteristics of optical storage media (e.g., compact disc, digital versatile disc, Blueray®, laser disc, etc.), magnetic storage media (e.g., hard disc, diskette, magnetic tape, etc.), computer memory device (e.g., flash memory, one-time-programmable memory, read-only memory, random access memory, thumb drive, etc.), etc. Such memory may, for example, be a temporary and/or permanent component of the system entity implementing the method 200. For example, in a scenario including the utilization of such hard media, step 210 may comprise receiving the user-selectable object information from such a device and/or from a reader of such a device (e.g., directly via an end-to-end conductor or via a communication network).

The object information corresponding to one or more user-selectable objects that is determined at step 210 (e.g., developed by a local process and/or received) may comprise any of a variety of characteristics, non-limiting examples of which will now be provided.

For example, such user-selectable object information may comprise information describing and/or defining the user-selectable object that is shown in the television program. Such information may, for example, be processed by a recipient of such information to identify an object that is being selected by a user. Such information may, for example, comprise information describing boundaries associated with a user-selectable object in the television program (e.g., actual object boundaries (e.g., an object outline), areas generally coinciding with a user-selectable object (e.g., a description of one or more geometric shapes that generally correspond to a user-selectable object), selection areas that when selected indicate user-selection of a user-selectable object (e.g., a superset and/or subset of a user-selectable object in the television program), etc. Such information may, for example, describe and/or define the user-selectable in a television program frame coordinate system.

Such information describing and/or defining the user-selectable object that is shown in the television program may comprise information describing movement of a user-selectable object in the television program. For example, such information may comprise information describing the location of the object on a frame-by-frame basis or time basis, information describing movement of a user-selectable object in television screen coordinates as a function of time and/or frame, information describing location of a user-selectable object in a video frame relative to a previous object location in a previous video frame, etc.

Many examples of such object description information are provided in a variety of related U.S. Patent Applications. For example, as mentioned previously, U.S. patent application Ser. No. 12/774,380, filed May 5, 2010, titled "SYSTEM AND METHOD IN A TELEVISION FOR PROVIDING USER-SELECTION OF OBJECTS IN A TELEVISION PROGRAM"; U.S. patent application Ser. No. 12/850,832, filed Aug. 5, 2010, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed Aug. 5, 2010, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/850,945, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,036, filed Aug. 5, 2010, titled "SYSTEM AND METHOD IN A TELEVISION SYSTEM FOR PROVIDING USER-SELECTION OF OBJECTS IN A TELEVISION PROGRAM"; and U.S. patent application Ser. No. 12/851,075, filed Aug. 5, 2010, titled "SYSTEM AND METHOD IN A PARALLEL TELEVISION SYSTEM FOR PROVIDING USER-SELECTION OF OBJECTS IN A TELEVISION PROGRAM", which are hereby incorporated herein by reference in their entirety, provide many examples of information describing (or otherwise related to) user-selectable objects in television programming.

Also for example, such user-selectable object information may comprise information describing the object, where such information may be presented to the user upon user-selection of a user selectable object. For example, such object information may comprise information describing physical characteristics of a user-selectable object, background information, historical information, general information of interest, location information, financial information, travel information, commerce information, personal information, etc.

Additionally for example, such user-selectable object information may comprise information describing and/or defining actions that may be taken upon user-selection of a user-selectable object, non-limiting examples of such actions and/or related information corresponding to a respective user-selectable object will now be presented.

For example, such user-selectable object information may comprise information describing a one or more manners of determining information to present to the user (e.g., retrieving such information from a known location, conducting a search for such information, etc.), establishing a communication session by which a user may interact with networked entities associated with a user-selected object, interacting with a user regarding display of a user-selected object and/or associated information, etc.

For example, such user-selectable object information may comprise information describing one or more manners of obtaining one or more sets of information, where such information may then, for example, be presented to the user. For example, such information may comprise a memory address (or data storage address) and/or a communication network address (e.g., an address of a networked data server, a URL, etc.), where such address may correspond to a location at which information corresponding to the identified object may be obtained. Such information may, for example, comprise a network address of a component with which a communication session may be initiated and/or conducted (e.g., to obtain information regarding the user-selected object, to interact with the user regarding the selected object, etc.).

In an exemplary scenario in which the user-selectable object information comprises information to present to a user upon user-selection of a selectable object in a television program, such information may comprise any of a variety of different types of information related to the user-selected object. For example and without limitation, such information may comprise information describing the user-selectable object (e.g., information describing aspects of the object, history of the object, design of the object, source of the object, price of the object, critiques of the object, information provided by commercial enterprises producing and/or providing such object, etc.), information indicating to the user how the user may obtain the selected object, information indicating how the user may utilize the selected object, etc. The information may, for example, comprise information of one or more non-commercial organizations associated with, and/or having information pertaining to, the identified user-selected object (e.g., non-profit and/or government organization contact information, web site address information, etc.).

In another exemplary scenario, the information corresponding to a user-selectable object in the television program may comprise information related to conducting a search for information corresponding to the user-selectable object. Such information may, for example, comprise network search terms that may be utilized in a search engine to search for information corresponding to the user-selected object. Such information may also comprise information describing the network boundaries of such a search, for example, identifying particular search networks, particular servers, particular addresses, particular databases, etc.

In an exemplary scenario the information corresponding to a user-selectable object may describe a manner in which a system is to intact with a user to more clearly identify information desired by the user. For example, such information may comprise information specifying user interaction that should take place when an amount of information available and corresponding to a user-selectable object exceeds a particular threshold. Such user interaction may, for example, help to reduce the amount of information that may ultimately be presented to the user. For example, such user information may comprise information describing a user interface comprising providing a list (or menu) of types of information available to the user and soliciting information from the user regarding the selection of one or more of the listed types of information.

In yet another exemplary scenario, in which an action associated with a user-selectable object comprises the establishment and/or management of a communication session between the user and one or more networked entities, the user-selectable object information may comprise information describing the manner in which a communication session may be established and/or management.

In still another exemplary scenario, in which an action associated with a user-selectable object comprises providing a user interface by which a user may initiate and perform a commercial transaction regarding a user-selectable object, the user-selectable object information may comprise information describing the manner in which the commercial transaction is to be performed (e.g., order forms, financial information exchange, order tracking, etc.).

As shown above, various user-selectable objects (or types of objects) may, for example, be associated with any of a variety of respective actions that may be taken upon selection of a respective user-selectable object by a user. Such actions (e.g., information retrieval, information searching, communication session management, commercial transaction management, etc.) may, for example, be included in a table or other data structure indexed by the identity of a respective user-selectable object.

Other non-limiting examples of object information corresponding to user-selectable objects in a television program may comprise: athlete information (e.g., statistics, personal information, professional information, history, etc.), entertainer information (e.g., personal information, discography and/or filmography information, information of related organizations, fan club information, photograph and/or video information, etc.), landmark information (e.g., historical information, visitation information, location information, mapping information, photo album information, visitation diary, charitable donation information, etc.), political figure information (e.g., party affiliation, stances on particular issues, history, financial information, voting record, attendance record, etc.), information regarding general types of objects (e.g., information describing actions to take upon user-selection of a person object, of a consumer good object, of a landmark object, etc.) and/or specific objects (e.g., information describing actions to take when a particular person object is selected, when a particular consumer good object is selected, when a particular landmark object is selected, etc.).

For additional non-limiting examples of actions that may be performed related to user-selectable objects in television programming, and related user-selectable object information that may be combined with television program moving picture information, the reader is directed to U.S. patent application Ser. No. 12/880,530, filed concurrently herewith, titled "SYSTEM AND METHOD IN A DISTRIBUTED SYSTEM FOR RESPONDING TO USER-SELECTION OF AN OBJECT IN A TELEVISION PROGRAM"; U.S. patent application Ser. No. 12/880,594, filed concurrently herewith, titled "SYSTEM AND METHOD IN A LOCAL TELEVISION SYSTEM FOR RESPONDING TO USER-SELECTION OF AN OBJECT IN A TELEVISION PROGRAM"; U.S. patent application Ser. No. 12/880,668, filed concurrently herewith, titled "SYSTEM AND METHOD IN A TELEVISION SYSTEM FOR RESPONDING TO USER-SELECTION OF AN OBJECT IN A TELEVISION PROGRAM BASED ON USER LOCATION"; U.S. patent application Ser. No. 12/881,067, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/881,096, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/880,749, filed concurrently herewith, titled "SYSTEM AND METHOD IN A TELEVISION SYSTEM FOR RESPONDING TO USER-SELECTION OF AN OBJECT IN A TELEVISION PROGRAM UTILIZING AN ALTERNATIVE COMMUNICATION NETWORK"; U.S. patent application Ser. No. 12/880,851, filed concurrently herewith, titled "SYSTEM AND METHOD IN A TELEVISION FOR PROVIDING ADVERTISING INFORMATION ASSOCIATED WITH A USER-SELECTED OBJECT IN A TELEVISION PROGRAM"; U.S. patent application Ser. No. 12/880,888, filed concurrently herewith, titled "SYSTEM AND METHOD IN A TELEVISION FOR PROVIDING INFORMATION ASSOCIATED WITH A USER-SELECTED PERSON IN A TELEVISION PROGRAM"; and U.S. patent application Ser. No. 12/881,110, filed concurrently herewith, titled "SYSTEM AND METHOD IN A TELEVISION FOR PROVIDING INFORMATION ASSOCIATED WITH A USER-SELECTED INFORMATION ELEMENT IN A TELEVISION PROGRAM". The entire contents of each of such applications are hereby incorporated herein by reference in their entirety.

In general, the above-mentioned types of information corresponding to user-selectable objects in television programming may be general to all eventual viewers of the television program, but may also be customized to a particular target user and/or end user. For example, such information may be customized to a particular user (e.g., based on income level, demographics, age, employment status and/or type, education level and/or type, family characteristics, religion, purchasing history, neighborhood characteristics, home characteristics, health characteristics, etc. For example, such information may also be customized to a particular geographical location or region.

In general, step 210 may comprise determining (e.g., receiving) user-selectable object information corresponding to one or more user-selectable objects in a television program. Accordingly, the scope of various aspects of the present invention should not be limited by characteristics of any particular type of such user-selectable object information or by any particular manner of determining such user-selectable object information unless explicitly claimed.

The exemplary method 200 may, at step 220, comprise forming a user-selectable object data set comprising the determined user-selectable object information (e.g., as determined at step 210), where the user-selectable object data set is independent of a television program data set generally representative of the television program. Step 220 may comprise performing such data set formation in any of a variety of manners, non-limiting examples of which will now be presented.

For example, step 220 may comprise forming the user-selectable object data set (e.g., a data file or other data structure, a logical grouping of data, etc.) in a manner that is synchronized with a television program (or a television program data set representative of a television program).

For example, in an exemplary scenario in which a television program data set is parsed into frames (e.g., intra-coded frames or inter-coded frames), step 220 may comprise forming the user-selectable object data set by, at least in part, parsing the user-selectable object information in a manner that logically mirrors the television program data set frames. For example, in a scenario where a user-selectable object appears in frame N of a television program, the user-selectable object information describing the user-selectable object may be placed in a corresponding frame (e.g., Nth frame, frame labeled "N", etc.) of the user-selectable object data set. In such a scenario, the user-selectable object data set might include null (or no) information in frames corresponding to television program frames that do not include any user-selectable objects. For example, the user-selectable object data set need not include information for frame P if corresponding frame P of the television program does not include any user-selectable objects.

As another example, in an exemplary scenario in which a television program data set is parsed into frames (e.g., intra-coded frames or inter-coded frames), step 220 may comprise forming the user-selectable object data set by, at least in part, including information indicating the frames of the television program in which the user-selectable object appears (e.g., along with the dimensions and/or movement of the user-selectable object as it appears in such frames of the television program). For example, in an exemplary scenario in which a user-selectable object appears in frames A-B of a television program, step 220 may comprise incorporating information into the user-selectable object data set that indicates the user-selectable object appears in frames A-B of the television program, along with information describing the dimensions and/or locations of the user-selectable object in such frames of the television program.

For example, in an exemplary scenario in which a television program data set is parsed into time segments, step 220 may comprise forming the user-selectable object data set by, at least in part, parsing the user-selectable object information in a manner that logically mirrors the television program time segments. For example, in a scenario where a user-selectable object appears in time segment M of a television program, the user-selectable object information describing the user-selectable object may be placed in a corresponding time segment (e.g., $M^{th}$ time segment, time segment labeled "M", etc.) of the user-selectable object data set. In such a scenario, the user-selectable object data set might include null (or no) information in time segments corresponding to television program time segments that do not include any user-selectable objects. For example, the user-selectable object data set need not include information for time segment Q if corresponding time segment Q of the television program does not include any user-selectable objects.

As another example, in an exemplary scenario in which a television program data set is parsed into time segments, step 220 may comprise forming the user-selectable object data set by, at least in part, including information indicating the time segments of the television program in which the user-selectable object appears (e.g., along with the dimensions and/or movement of the user-selectable object as it appears in such time segments of the television program. For example, in an exemplary scenario in which a user-selectable object appears in time segments C-D of a television program, step 220 may comprise incorporating information into the user-selectable object data set that indicates the user-selectable object appears in time segments C-D of the television program, along with information describing the dimensions and/or locations of the user-selectable object in such time segments of the television program.

Note that in an exemplary scenario in which the user-selectable object data set includes information that synchronizes the user-selectable object data set to the television program data set, not all information of the user-selectable object data set need be so synchronized. For example, information corresponding to user-selectable objects that is not time and/or frame-specific may be included in the user-selectable object data set in an unsynchronized (or asynchronous) manner. In an exemplary scenario, information describing user-selectable objects (or selectable regions thereof) as such user-selectable objects appear in a presented television program may be frame and/or time synchronized to the television program data set, while information to be presented to the user upon user-selection of such user-selectable objects and/or information describing any action to take upon user-selection of such user-selectable objects may be included in the user-selectable object data set in an unsynchronized manner (e.g., in a data structure that is indexed by object identity to retrieve such information).

Though the above examples were directed to frame-based and/or time-based synchronization of the user-selectable object data set to the television program (e.g., a corresponding television program data set), other synchronization information may also be utilized. For example, step 220 may comprise incorporating data markers into the user-selectable object data set that correspond to respective markers in a television program data set. Also for example, step 220 may comprise incorporating data pointers into the user-selectable object data set that point to respective absolute and/or relative locations within a television program data set.

The above examples generally apply to information describing the presence of user-selectable objects in the television program. As discussed previously, the user-selectable object information may also comprise information to be provided to the user upon selection of a user-selectable object, information describing communication sessions and/or other actions that may be performed upon selection of the user-selectable object, etc. Note that in particular exemplary scenarios, such information may be incorporated into the user-selectable object data set at step 220. For example, step 220 may comprise incorporating such user-selectable object information into the user-selectable object data set in a manner that provides for indexing such information by object identity. For example, such information need only be incorporated into the user-selectable object data set one time (e.g., positioned in the user-selectable object data set such that a recipient of the user-selectable object data set will have received such information prior to user selection of the user-selectable object corresponding to such information). For example, in an exemplary scenario involving a user-selectable consumer good in a television program, step 220 may comprise forming the user-selectable object data set such that, when communicated to a user's local television system, information of actions to perform upon user selection of the consumer good in the television program will have been received by the user's local television system prior to the user's first opportunity to select the consumer good in the television program.

As discussed above, the user-selectable object data set formed at step 220 may comprise characteristics of different types of data sets (or structures). For example, step 220 may comprise forming a data file that comprises the user-selectable object information. Such a user-selectable object data file may, for example, comprise metadata that correlates the user-selectable object data file to one or more corresponding television program data files that are utilized to communicate the general television program (e.g., without user-selectable object information).

Step 220 may also, for example, comprise forming an array of the user-selectable object information. Such an array may, for example, be indexed by television program frame number. For example, index W of such an array may correspond to frame W of a television program. In such a scenario, index W may then correspond to a data record (or group of data records) in the array that describes a user-selectable object (or group of user-selectable objects) that appear in frame W of the television program.

Similarly, step 220 may comprise forming a linked list of data records. Such a linked list may, for example, be a multi-dimensional linked list with frame (or time) in a first dimension and user-selectable object records corresponding to the frame (or time) in a second dimension. Such a linked-list implementation may, for example, save memory space over an array-based implementation when a significant number of television program frames do not include user-selectable objects. For example, memory space need not be allocated in the user-selectable object data set for television program frames that present no user-selectable objects.

Additionally, step 220 may comprise forming a searchable data structure to include user-selectable object information for all (or a subset) of user-selectable objects presented in a television program. In such an implementation, step 220 may, for example, comprise forming such user-selectable object information in an ordered list of user-selectable objects. Such an ordered list may, for example, be advantageous by providing for efficient searching for user-selectable object information for an object that has been selected by a user. Thus, the user-selectable object data set may comprise a plurality of different types of data structures (e.g., a first data structure comprising information that (e.g., on a frame-by-frame basis) describes how user-selectable objects appear in the television program as the television program is presented to a user, and a second data structure that comprises information related to activity that is to be performed upon user selection of user-selectable objects in the television program.

As mentioned above, the user-selectable object data set may be independent of one or more television program data sets generally representative of the television program. Such an implementation advantageously provides for independent formation and maintenance of the user-selectable object data set that corresponds to the television program. For example, in such an implementation, a data set (e.g., a television program data file, MPEG file, etc.) for a television program may be developed (e.g., by a television program studio) for communication of the television program to all users, while a data set for user-selectable objects in the television program may be developed (e.g., by an advertising company, by a television program sponsor, by a television network operator, by one or more components of a user's local television system, etc.) independently. In such a scenario, the user-selectable object data set may be developed and/or changes may be made to the user-selectable object data set without impacting the television program data set. Also, in such a scenario, as mentioned above, user-selectable object information may be customized to a user or group of users. In such a scenario, a plurality of different user-selectable object data sets may be developed that each correspond to the same television program data set. For example, step 220 may comprise forming a first user-selectable object data set for a New York audience of a television program, and forming a second user-selectable object data set for a Los Angeles audience of the television program without necessitating modification of the television program data set, which communicates the television program in the same manner to each of the New York and Los Angeles audiences.

In general, step 220 may comprise forming a user-selectable object data set comprising the determined user-selectable object information (e.g., as determined at step 210), where the user-selectable object data set is independent of a television program data set generally representative of the television program. Accordingly, the scope of various aspects of the present invention should not be limited by characteristics of particular types of user-selectable object data, characteristics of particular types of user-selectable object data sets, and/or characteristics of any particular manner of forming user-selectable object data sets unless explicitly claimed.

The exemplary method 200 may, at step 230, comprise communicating the formed user-selectable object data set (e.g., as formed at step 220) to one or more recipients. Step 230 may comprise performing such communicating in any of a variety of manners, non-limiting examples of which will now be provided.

For example, step 230 may comprise communicating the user-selectable object data set in one or more data streams (which may be called "user-selectable object data streams" herein) independent of one or more television program data streams that generally communicate the television program (i.e., that generally communicate the television program data set). Note that, while such television program data set generally need not comprise information of user-selectable objects therein, such information may be present. For example, the user-selectable object data set may comprise information of user-selectable objects in the television program that supplement (e.g., append and/or amend) information of user-selectable objects that might be present in the television program data set.

Step 230 may, for example, comprise communicating the user-selectable object data set time-synchronized to communication of the television program data set. For example, even in a scenario in which the user-selectable object data set is independent of the general television program data set, step 230 may still time-synchronize communication of the user-selectable object data set with communication of the general television program data set.

For example, in such an exemplary scenario, step 230 may comprise communicating the user-selectable object data concurrently (e.g., simultaneously and/or pseudo-simultaneously in a time-sharing manner) with communication of the television program data set that generally communicates the television program. For example, such concurrent communication may comprise communicating at least a portion of the user-selectable object data set and at least a portion of the television program data set in a time-multiplexed manner (e.g., via a shared communication channel (e.g., a frequency channel, a code channel, a time/frequency channel, etc.)). Also for example, such concurrent communication may comprise communicating the user-selectable object data set in parallel with communication of the television program data set (e.g., on separate respective sets of one or more parallel communication channels).

Also for example, step 230 may comprise communicating the user-selectable object data set via at least one communication channel that is different from one or more communication channels over which the television program data set is communicated. For example, even in a scenario in which the user-selectable object data set and the television program data set are communicated over at least one shared communication channel, step 230 may comprise communicating the user-selectable object data set in at least one communication channel that is different from the communication channel(s) over which the television program data set is communicated.

Step 230 may, for example, comprise communicating the user-selectable object data set over a first communication network that is different from a second communication network over which the television program data set is communicated. As a non-limiting example, step 230 may comprise communicating the user-selectable object data set over a first communication network (e.g., a first general data communication network), where the television program data set is communicated over a second communication network (e.g., a second general data communication network).

Step 230 may, for example, comprise communicating the user-selectable object data set over a first type of communication network that is different from a second type of communication network over which the television program data set is communicated. As a non-limiting example, step 230 may comprise communicating the user-selectable object data set over a first general data communication network, where the television program data set is communicated over a television communication network (e.g., a cable television network, a satellite television network, etc.).

Also for example, step 230 may comprise communicating the user-selectable object data set utilizing a first communication protocol that is different from a second communication protocol that is utilized to communicate the television program data set. For example, step 230 may comprise communicating the user-selectable data set utilizing TCP/IP, while the general television program data set is communicated utilizing a cable television protocol.

Also for example, step 230 may comprise communicating the user-selectable object data set to a first set of one or more user local television systems, where the first set is a subset of a second set of user local television systems to which the television program data set is communicated. For example, step 230 may comprise multicasting the user-selectable object data set to a multicast group, where the television program data set is broadcast to a superset of the multi-cast group. Also for example, step 230 may comprise unicasting the user-selectable object data set to a single user local television system, where the television program data set is broadcast or multicast to a superset of the single user.

Additionally for example, step 230 may comprise communicating the user-selectable object data set to a first set of one or more components of a user's local television system, where at least a portion of such first set is different from a second set of one or more components of the user's local television system to which the television program data set is communicated. For example, in a non-limiting exemplary scenario in which the television program data set is being communicated to a television receiver and a television controller of a user's local television system, step 230 may comprise communicating the user-selectable object data set to the television controller and not to the television receiver.

Step 230 may comprise communicating the user-selectable object data set with or without regard for the timing of the communication of the television program (e.g., the television program data set) to which the user-selectable object data set corresponds. For example, step 230 may comprise communicating the user-selectable object data set whenever the television program data set is communicated. Also for example, step 230 may comprise communicating the entire user-selectable object data set before the television program data set is communicated. In such a scenario, the recipient of the communicated user-selectable object data set may be assured of having received such data set prior to receipt of the television program to which the user-selectable object data set corresponds.

Though the previous examples generally concerned step 230 communicating the user-selectable object data set via a communication network to one or more destination systems, step 230 may also comprise communicating the user-selectable object data set to a storage device where the user-selectable object data set is stored in a storage medium, for example an optical storage media (e.g., compact disc, digital versatile disc, Blueray®, laser disc, etc.), magnetic storage media (e.g., hard disc, diskette, magnetic tape, etc.), computer memory device (e.g., flash memory, one-time-programmable memory, read-only memory, random access memory, thumb drive, etc.), etc. Such memory may, for example, be a temporary and/or permanent component of the system entity implementing the method 200.

In such a scenario, step 230 may comprise communicating the user-selectable object data set to a storage device where the user-selectable object data set is stored in a same storage medium as a medium on which the television program data set is stored. For example, the user-selectable object data set may be stored in one or more data structures that are independent of one or more data structures in which the television program data set is stored (e.g., stored in one or more separate data files).

Also, in such a scenario, step 230 may comprise communicating the user-selectable object data set to one or more devices of the user's local television system (e.g., a television receiver, a digital video recorder, a television, a television controller, a personal computer, etc.) and/or one or more devices of a television source system and/or one or more devices of a television programming distribution system for storage in such device(s).

In general, step 230 may comprise communicating the formed user-selectable object data set (e.g., as formed at step 220) to one or more recipients (e.g., an end user or associated system, television programming provider or associated system, an advertiser or associated system, a television program producer or associated system, a television program database, a television program server, etc.). Accordingly, the scope of various aspects of the present invention should not be limited by characteristics of any particular manner of performing such communicating or by any particular recipient of such communication unless explicitly claimed.

The exemplary method 200 may, for example at step 295, comprise performing continued operations. Step 295 may comprise performing any of a variety of continued operations, non-limiting examples of such continued operation(s) will be presented below. For example, step 295 may comprise returning execution flow to any of the previously discussed method steps. For example, step 295 may comprise returning execution flow of the exemplary method 200 to step 210 for receiving additional user-selectable object information to form into an independent user-selectable object data set and communicate. Additionally for example, step 295 may comprise returning execution flow of the exemplary method 200 to step 230 for additional communication of the user-selectable object data set (e.g., to additional recipients).

In general, step 295 may comprise performing continued operations (e.g., performing additional operations corresponding to forming and/or communicating user-selectable object data sets related to user-selectable objects in a television program. Accordingly, the scope of various aspects of the present invention should not be limited by characteristics of any particular type of continued processing unless explicitly claimed.

Figure 3:
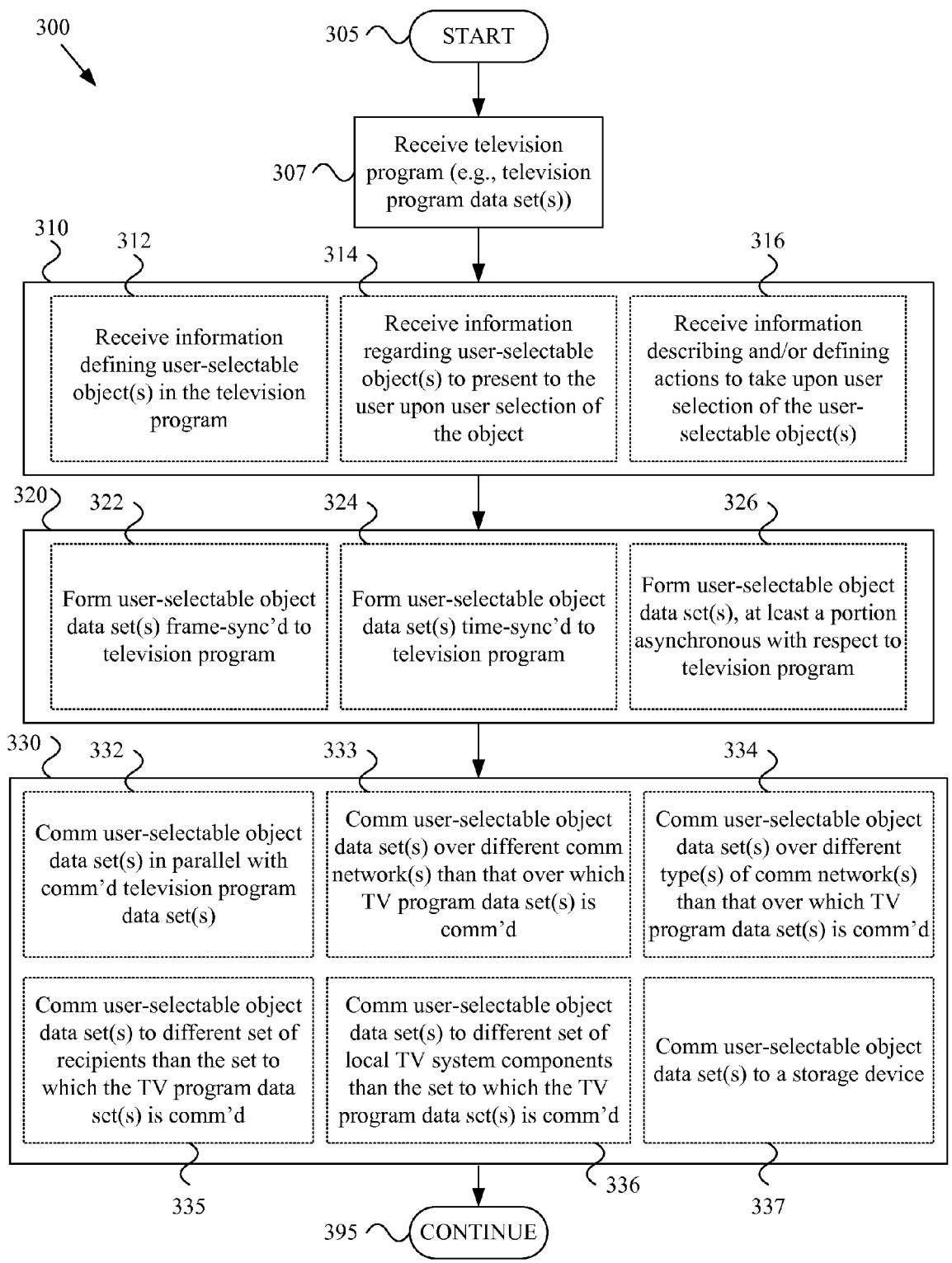
FIG. 3 is a flow diagram illustrating an exemplary method for providing information of selectable objects in a television program in an information stream independent of the television program, in accordance with various aspects of the present invention.

Turning next to FIG. 3, such figure is a flow diagram illustrating an exemplary method 300 for providing information of selectable objects in a television program, in accordance with various aspects of the present invention. The exemplary method 300 may, for example, share any or all characteristics with the exemplary method 200 illustrated in FIG. 2 and discussed previously. Any or all aspects of the exemplary method 300 may, for example, be implemented in a television system component (e.g., the television provider 110, third party program information provider 120, a component of a communication network 130, first television 140, first television controller 160, second television 141, television receiver 151, second television controller 161, shown in FIG. 1 and discussed previously) and/or a plurality of such television system components operating in conjunction. For example, any or all aspects of the exemplary method 300 may be implemented in one or more television system components remote from the user's local television system. Also for example, any or all aspects of the exemplary method 200 may be implemented in one or more components of the user's local television system.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may, for example at step 307, comprise receiving a television program (e.g., one or more television program data sets that generally communicate a television program, for example with or without information of user-selectable objects in the television program) and/or moving picture information corresponding to such a television program. Many non-limiting examples of such television programs were provided above. Note that, depending on the particular implementation, such moving picture information may also, for example, be received with corresponding audio information.

Step 307 may comprise receiving the television program (e.g., at least moving picture information associated therewith) from any of a variety of sources, non-limiting examples of which will now be provided. For example and without limitation, step 307 may comprise receiving the television program information from a television broadcasting company, from a movie streaming company, from a television studio, from a television program database or server, from a video camera or other video recording device, an Internet television programming provider, etc.

Step 307 may comprise receiving the television program information via any of a variety of types of communication networks. Such networks may, for example, comprise a wireless television network (e.g., terrestrial and/or satellite) and/or cable television network. Such networks may, for example, comprise any of variety of general data communication networks (e.g., the Internet, a local area network, a personal area network, a metropolitan area network, etc.).

Step 307 may comprise receiving the television program information (e.g., at least moving picture information for the television program) from any of a variety of types of hard media (e.g., optical storage media, magnetic storage media, etc.). Such hard media may, for example, comprise characteristics of optical storage media (e.g., compact disc, digital versatile disc, Blueray®, laser disc, etc.), magnetic storage media (e.g., hard disc, diskette, magnetic tape, etc.), computer memory device (e.g., flash memory, one-time-programmable memory, read-only memory, random access memory, thumb drive, etc.). Such memory may, for example, be a temporary and/or permanent component of the system entity implementing the method 300. For example, in a scenario including the utilization of such hard media, step 307 may comprise receiving the moving picture information from such a device and/or from a reader of such a device (e.g., directly via an end-to-end conductor or via a communication network).

In an exemplary scenario, step 307 may comprise receiving one or more completed television program data sets for the television program, the completed television program data set(s) formatted for communicating the television program without information describing user-selectable objects in the television program. For example, the received completed television program data set may be in conformance with a moving picture standard (e.g., MPEG, MPEG-2, MPEG-4, MPEG-4 AVC, DVD, way, etc.). For example, such a data set may be a data file (or set of logically linked data files) formatted in an MPEG or DVD format for normal presentation on a user's local television system. Such a data set of a television program, when received at step 307, might not have information of user-selectable objects in the television program. Such information of user-selectable objects may then, for example, be received and/or formed into one or more user-selectable object data sets that are independent of the television program data set(s), as will be explained below.

In another exemplary scenario, step 307 may comprise receiving television program information for the television program prior to the television program (e.g., moving picture data) information being formatted into a completed moving picture data set for communicating the television program. In an exemplary implementation, step 307 may comprise receiving television program information (e.g., frame-by-frame bitmaps, partially encoded moving picture information, etc.) that will be formatted in accordance with a moving picture standard, but which has not yet been so formatted. Such a data set of a television program, when received at step 307, might not have information of user-selectable objects in the television program. Such information of user-selectable objects may then, for example, be received and/or formed into an independent user-selectable object data set, as will be explained below.

In yet another exemplary scenario, step 307 may comprise receiving a completed television program data set comprising a moving picture data set for the television program and information of user-selectable objects in the television program, the completed television program data set formatted for communicating the television program with information describing user-selectable objects in the television program. For example, the received completed television program data set may be formatted in conformance with a moving picture standard (e.g., MPEG, MPEG-2, MPEG-4, MPEG-4 AVC, DVD, way, etc.), or a variant thereof, that specifically accommodates information of user-selectable objects in the television program. Also for example, the received completed television program data set may be in conformance with a moving picture standard (e.g., MPEG, MPEG-2, MPEG-4, MPEG-4 AVC, DVD, way, etc.), or a variant thereof, that while not specifically accommodating information of user-selectable objects in the television program, allows for the incorporation of such information in unassigned data fields. For example, such a data set may be a data file (or set of logically linked data files) formatted in an MPEG or DVD format for normal presentation on a user's local television system. Such a television program data set, when received at step 307, might comprise information of user-selectable objects in the television program. As discussed previously in the discussion of FIG. 2, the independent user-selectable object data set formed at step 320 may be utilized to supplement user-selectable object information that is already contained in the television program data set.

Step 307 may, for example, comprise receiving the television program information in digital and/or analog signals. Though the examples provided above generally concerned the receipt of digital data, such examples are readily extendible to the receipt of analog moving picture information (e.g., the receipt of composite and/or component video signals, etc.).

In general, step 307 may comprise receiving television program information (e.g., one or more television program data sets). Accordingly, the scope of various aspects of the present invention should not be limited by characteristics of any particular type of television program information or by any particular manner of receiving television program information unless explicitly claimed.

The exemplary method 300 may, for example at step 310, comprise determining (e.g., receiving from a local and/or remote source) user-selectable object information corresponding to one or more user-selectable objects in a television program (e.g., a television program, or television program data set comprising television program data, received at step 307). Step 310 may, for example, share any or all characteristics with step 210 of the exemplary method 200 illustrated in FIG. 2 and discussed previously. For example, step 310 may comprise receiving any of the various types of user-selectable object information from any of the various sources of user-selectable object information via any of the various types of media discussed previously with regard to the method 200 of FIG. 2 and the system 100 of FIG. 1 and elsewhere herein.

For example, step 310 may comprise, for example at sub-step 312, receiving user-selectable object information comprising information describing and/or defining the user-selectable object that is shown in the television program (e.g., object dimension information, object movement information, information describing an on-screen selection area associated with the object, etc.). Also for example, step 310 may comprise, for example at sub-step 314, receiving user-selectable object information comprising information regarding the user-selectable object that may be presented to the user upon user-selection of such object in a television program.

Additionally for example, step 310 may comprise, for example at sub-step 316, receiving user-selectable object information comprising information describing and/or defining actions that may be taken upon user-selection of a user-selectable object (e.g., retrieving and/or obtaining and/or searching for information about a user-selectable object, information specifying a manner in which a system is to interact with a user regarding a user-selected object, searching for information, establishing and/or maintaining communication sessions, information describing the manner in which the commercial transaction is to be performed, etc.).

The exemplary method 300 may, for example at step 320, comprise forming one or more user-selectable object data sets comprising the determined user-selectable object information (e.g., as determined at step 220), where the user-selectable object data set is independent of a television program data set generally representative of the television program. Step 320 may, for example, share any or all characteristics with step 220 of the exemplary method 200 illustrated in FIG. 2 and discussed previously.

For example, step 320 may comprise, for example at sub-step 322, forming the user-selectable object data set (e.g., a data file or other data structure, a logical grouping of data, etc.) in a manner that is frame-synchronized with a television program (or a television program data set representative of a television program). Also for example, step 220 may comprise, for example at sub-set 324, forming the user-selectable object data set (e.g., a data file or other data structure, a logical grouping of data, etc.) in a manner that is time-synchronized with a television program (or a television program data set representative of a television program). Additionally for example, step 320 may comprise, for example at sub-step 326, forming the user-selectable object data set, where at least a portion of such data set is asynchronous with regard to a television program that includes the user-selectable objects.

The exemplary method 300 may, for example at step 330, comprise communicating the formed user-selectable object data set(s) (e.g., as formed at step 320) to one or more recipients. Step 330 may, for example, share any or all characteristics with step 230 of the exemplary method 200 illustrated in FIG. 2 and discussed previously.

For example, step 330 may, for example at sub-step 332, comprise communicating the user-selectable object data set(s) in parallel with the communicated television program data set(s) (e.g., in parallel respective communication channels of a communication network). Also for example, step 330 may, for example at sub-step 333, comprise communicating the user-selectable object data set(s) over one or more communication networks different from the communication network(s) over which the television program data set(s) is communicated.

Additionally for example, step 330 may, for example at sub-step 334, comprise communicating the user-selectable object data set(s) over one or more different types of communication networks than the type(s) of communication network(s) over which the television program data set(s) is communicated. Further for example, step 330 may, for example at sub-step 335, comprise communicating the user-selectable object data set(s) to a set of recipients that is at least partially different from a set of recipients of the television program data set(s).

Still further for example, step 330 may, for example at sub-step 336, comprise communicating the user-selectable object data set(s) to a set of local television system components of a user, where such set is at least partially different from a set of local television system components of the user to which the television program data set(s) is being communicated. Also for example, step 330 may, for example at sub-step 337, comprise communicating the user-selectable object data set(s) to one or more devices for storage.

The exemplary method 300 may, for example at step 395, comprise performing continued operations. Step 395 may, for example, share any or all characteristics with step 295 of the exemplary method 200 illustrated in FIG. 2 and discussed previously.

Figure 4:
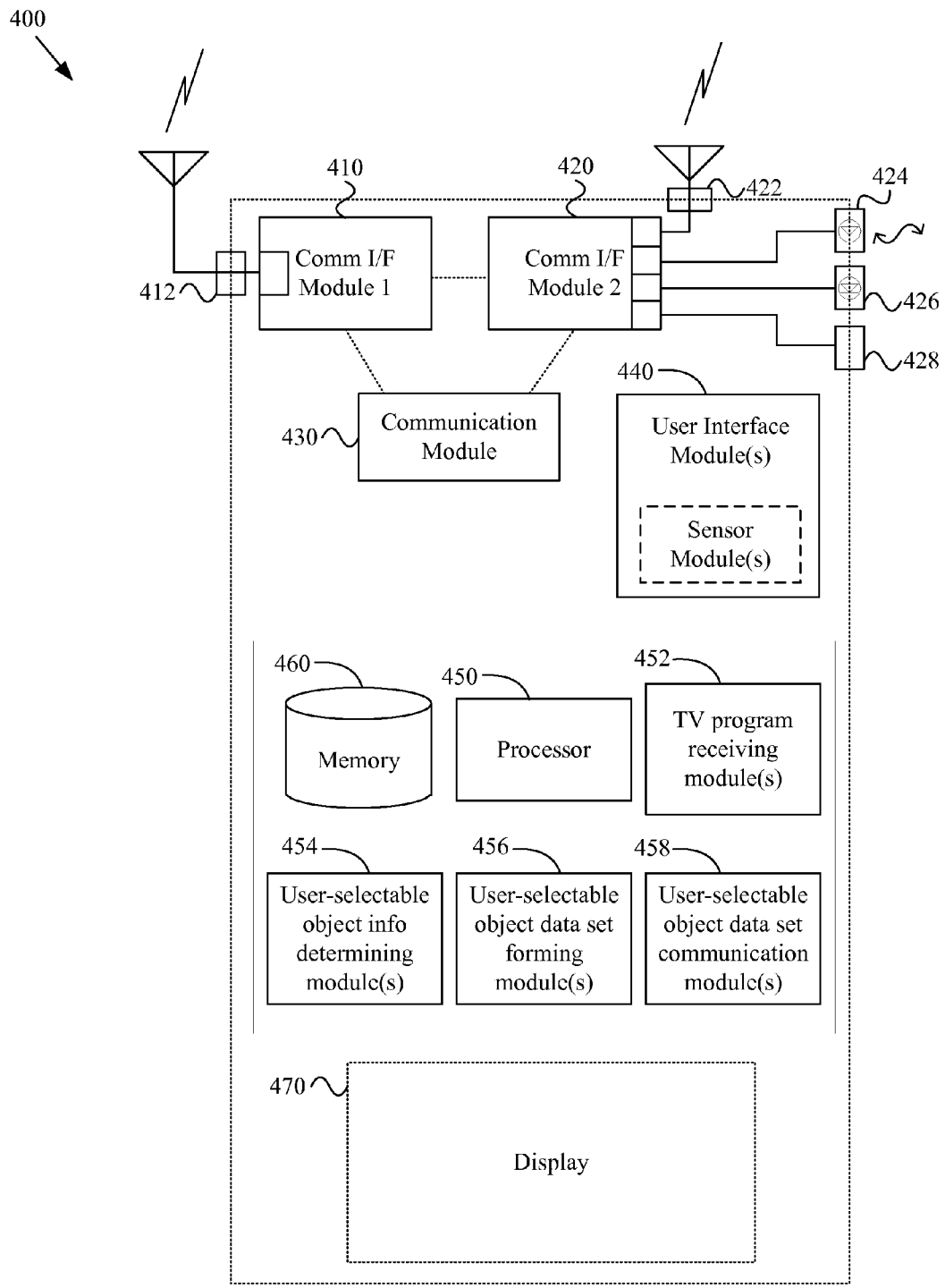
FIG. 4 is a diagram illustrating an exemplary television system, in accordance with various aspects of the present invention.

Turning next to FIG. 4, such figure is a diagram illustrating an exemplary television system (e.g., single television system component and/or plurality of television system components) 400, in accordance with various aspects of the present invention. The exemplary television system 400 may, for example, share any or all characteristics with one or more of the television system components illustrated in FIG. 1 and discussed previously. For example, the exemplary television system 400 may correspond to any of the television system components illustrated in FIG. 1 (or the like) or any group of the television system components illustrated in FIG. 1 (or the like). Also, the exemplary television system 400 may comprise characteristics of a computing system (e.g., a personal computer, a mainframe computer, a digital signal processor, etc.). The exemplary television system 400 (e.g., various modules thereof) may operate to perform any or all of the functionality discussed previously with regard to the exemplary methods 200 and 300 illustrated in FIGS. 2-3 and discussed previously.

The exemplary television system 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, general data communication networks, the Internet, local area networks, personal area networks, metropolitan area networks, etc.) via which television-related information (e.g., moving picture information, information of user-selectable objects, television programming with and without embedded information of user-selectable objects) and/or other data is communicated. Also for example, the first communication interface module 410 may operate to communicate with local sources of television-related content or other data (e.g., disc drives, computer-readable medium readers, video recorders, video cameras, computers, receivers, etc.). Additionally, for example, the first communication interface module 410 may operate to communicate with a remote controller (e.g., directly or via one or more intermediate communication networks).

The exemplary television system 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, general data communication networks, the Internet, local area networks, personal area networks, metropolitan area networks, etc.) via which television-related information (e.g., moving picture information, information of user-selectable objects, television programming with and without embedded information of user-selectable objects) and/or other data is communicated. Also for example, the second communication module 420 may operate to communicate with local sources of television-related information (e.g., disc drives, computer-readable medium readers, video recorders, video cameras, computers, receivers, etc.). Additionally, for example, the second communication module 420 may operate to communicate with a remote controller (e.g., directly or via one or more intervening communication networks).

Figure 5:
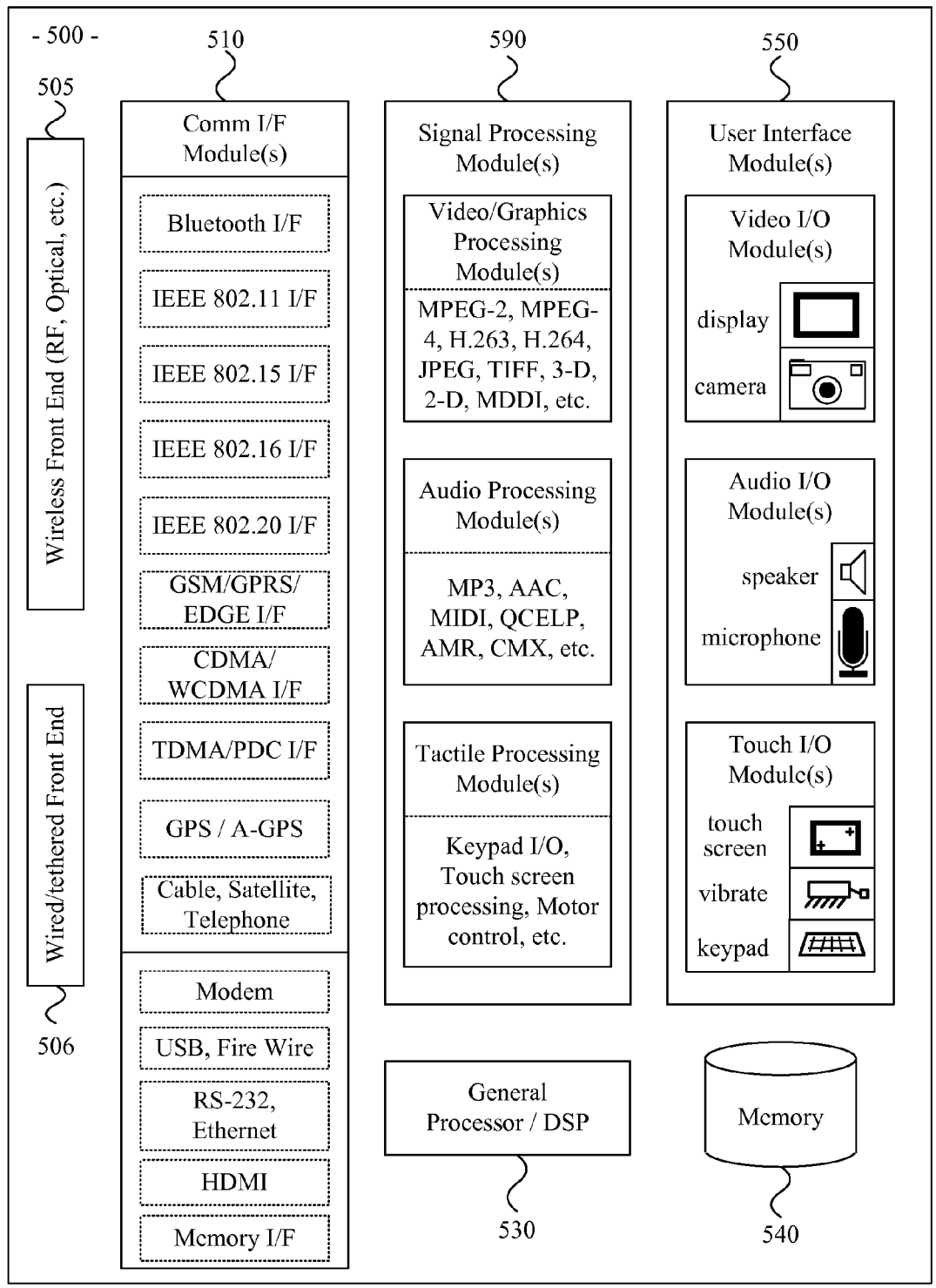
FIG. 5 is a diagram illustrating exemplary modules and/or sub-modules for a television system, in accordance with various aspects of the present invention.

The exemplary television system 400 may also comprise additional communication interface modules, which are not illustrated (some of which may also be shown in FIG. 5). Such additional communication interface modules may, for example, share any or all aspects with the first 410 and second 420 communication interface modules discussed above.

The exemplary television system 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television system 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television system 400 may additionally comprise one or more user interface modules 440. The user interface module 440 may generally operate to provide user interface functionality to a user of the television system 400. For example, and without limitation, the user interface module 440 may operate to provide for user control of any or all standard television system commands (e.g., channel control, volume control, on/off, screen settings, input selection, etc.). The user interface module 440 may, for example, operate and/or respond to user commands utilizing user interface features disposed on the television system (e.g., buttons, etc.) and may also utilize the communication module 430 (and/or first 410 and second 420 communication interface modules) to communicate with other systems and/or components thereof, regarding television-related information, regarding user interaction that occurs during the formation of combined dataset(s), etc. (e.g., a television system controller (e.g., a dedicated television system remote control, a universal remote control, a cellular telephone, personal computing device, gaming controller, etc.)). In various exemplary scenario, the user interface module(s) 440 may operate to utilize the optional display 470 to communicate with a user regarding user-selectable object information and/or to present television programming to a user.

The user interface module 440 may also comprise one or more sensor modules that operate to interface with and/or control operation of any of a variety of sensors that may be utilized during the performance of the combined data set(s). For example, the one or more sensor modules may be utilized to ascertain an on-screen pointing location, which may for example be utilized to input and/or received user-selectable object information (e.g., to indicate and/or define user-selectable objects in a moving picture). For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module 440 (or sensor module(s) thereof) may operate to control the transmission of signals (e.g., RF signals, optical signals, acoustic signals, etc.) from such sensors. Additionally, the user interface module 440 may perform any of a variety of video output functions (e.g., presenting moving picture information to a user, presenting user-selectable object information to a user, presenting television programming to a user, providing visual feedback to a user regarding an identified user-selected object in a presented moving picture, etc.).

The exemplary television system 400 may comprise one or more processors 450. The processor 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed by a processor executing instructions. For example, though various modules are illustrated as separate blocks or modules in FIG. 4, such illustrative modules, or a portion thereof, may be implemented by the processor 450.

The exemplary television system 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

The exemplary television system 400 may comprise one or more modules 452 (e.g., television program (or moving picture information) receiving module(s)) that operate to receive information for a television program. Such one or more modules 452 may, for example, operate to utilize the communication module 430 (e.g., and at least one of the communication interface modules 410, 420) to receive such television program information. For example, such one or more modules 452 may operate to perform step 307 of the exemplary method 300 discussed previously.

The exemplary television system 400 may comprise one or more module(s) 454 (e.g., user-selectable object information receiving module(s)) that operate to receive object information corresponding to one or more user-selectable objects in a television program. Such one or more modules 454 may, for example, operate to utilize the communication module 430 (e.g., and at least one of the communication interface modules 410, 420) to receive such television program user-selectable object information from a source external to the television system 400 and/or may operate to receive such user-selectable object information from a process being executed locally by the processor 450 (e.g., a process by which a user may specify user-selectable object information). For example, such one or more modules 454 may operate to perform step 210 of the exemplary method 200 discussed previously and/or step 310 of the exemplary method 300 discussed previously.

The exemplary television system 400 may comprise one or more modules 456 (e.g., user-selectable object data set forming module(s)) that operate to form one or more user-selectable object data sets comprising the determined user-selectable object information (e.g., as determined by module(s) 454), where the user-selectable object data set is independent of a television program data set generally representative of the television program. For example, such one or more modules 456 may operate to perform step 220 of the exemplary method 200 discussed previously and/or step 320 of the exemplary method 300 discussed previously.

The exemplary television system 400 may comprise one or more modules 458. Such module(s) 458 (e.g., user-selectable object data set communication module(s)) that operate to communicate the formed user-selectable object data set(s) (e.g., as formed by module(s) 456) to one or more recipients. For example, such module(s) 458 may operate to utilize the communication module(s) 430 (and, for example, one or both of the first communication interface module(s) 410 and second communication interface module(s) 420)) to communicate the user-selectable object data set. Also for example, such module(s) 458 may operate to communicate the user-selectable object data set to one or more system devices that store the user-selectable object data set on a physical medium (e.g., a computer-readable medium). Such one or more modules 458 may operate to perform step 230 of the exemplary method 200 discussed previously and/or step 30 of the exemplary method 300 discussed previously.

Though not illustrated, the exemplary television system 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 452, 454, 456 and 458) may be performed by the processor(s) 450 executing instructions stored in the memory 460.

Turning next to FIG. 5, such figure is a diagram illustrating exemplary modules and/or sub-modules for a television system 500, in accordance with various aspects of the present invention. The exemplary television system 500 may share any or all aspects with the television system 400 illustrated in FIG. 4 and discussed previously. For example, the exemplary television system 500 may, for example, share any or all characteristics with one or more of the television system components illustrated in FIG. 1 and discussed previously. For example, the exemplary television system 500 may correspond to any of the television system components illustrated in FIG. 1 (or the like) or any group of the television system components illustrated in FIG. 1 (or the like). For example, the exemplary television system 500 (or various modules thereof) may operate to perform any or all functionality discussed herein with regard to the exemplary method 200 illustrated in FIG. 2 and the exemplary method 300 illustrated in FIG. 3.

For example, the television system 500 comprises a processor 530. Such a processor 530 may, for example, share any or all characteristics with the processor 450 discussed with regard to FIG. 4. Also for example, the television system 500 comprises a memory 540. Such memory 540 may, for example, share any or all characteristics with the memory 460 discussed with regard to FIG. 4.

Also for example, the television system 500 may comprise any of a variety of user interface module(s) 550. Such user interface module(s) 550 may, for example, share any or all characteristics with the user interface module(s) 440 discussed previously with regard to FIG. 4. For example and without limitation, the user interface module(s) 550 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television system 500 may also, for example, comprise any of a variety of communication modules (505, 506, and 510). Such communication module(s) may, for example, share any or all characteristics with the communication interface module(s) 410, 420 discussed previously with regard to FIG. 4. For example and without limitation, the communication interface module(s) 510 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HS- DPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television system 500 is also illustrated as comprising various wired 506 and/or wireless 505 front-end modules that may, for example, be included in the communication interface modules and/or utilized thereby.

The exemplary television system 500 may also comprise any of a variety of signal processing module(s) 590. Such signal processing module(s) 590 may share any or all characteristics with modules of the exemplary television system 400 that perform signal processing. Such signal processing module(s) 590 may, for example, be utilized to assist in processing various types of information discussed previously (e.g., with regard to sensor processing, position determination, video processing, image processing, audio processing, general user interface information data processing, etc.). For example and without limitation, the signal processing module(s) 590 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

In summary, various aspects of the present invention provide a system and method for providing information of selectable objects in a television program in an information stream independent of the television program. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for communicating television program information, the method comprising:
   by the television system:
      determining user-selectable object information corresponding to one or more user-selectable objects in a television program;
      forming a user-selectable object data set comprising the determined user-selectable object information, wherein the user-selectable object data set is independent of a television program data set generally representative of the television program, wherein the user-selectable object information is parsed into segments of the user-selectable object data set according to time segments of the television program, and wherein the user-selectable object data set includes information regarding movement of the one or more user-selectable objects during each time segment; and
      communicating the formed user-selectable object data set to one or more recipients.

2. The method of claim 1, wherein said communicating comprises communicating the user-selectable object data set in one or more user-selectable object data streams independent of one or more television program data streams that generally communicate the television program data set.

3. The method of claim 2, wherein said communicating comprises concurrently communicating the user-selectable object data set and the television program data set.

4. The method of claim 3, wherein said concurrently communicating comprises communicating the user-selectable object data set and the television program data set on separate respective parallel communication channels.

5. The method of claim 2, wherein said communicating comprises communicating the user-selectable object data set on at least one communication channel different from one or more communication channels over which the television program data set is communicated.

6. The method of claim 2, wherein said communicating comprises communicating the user-selectable object data set over a first communication network that is different from a second communication network over which the television program data set is communicated.

7. The method of claim 2, wherein said communicating comprises communicating the user-selectable object data set to a first set of one or more user local television systems, where the first set is a subset of a second set of user local television systems to which the television program data set is communicated.

8. The method of claim 2, wherein said communicating comprises communicating the user-selectable object data set without regard for timing of communication of the television program data set.

9. The method of claim 1, wherein said forming a user-selectable object data set comprises:
   determining linking information logically linking the user-selectable object data set to the television program data set; and
   incorporating the linking information into the user-selectable object data set.

10. The method of claim 9, wherein said determined linking information comprises time information.

11. The method of claim 9, wherein said determined linking information comprises frame number information.

12. The method of claim 1, wherein the received object information describing a user-selectable object in the television program comprises customized object information that is customized to a particular set of one or more users.

13. The method of claim 1, wherein the received object information corresponding to a user-selectable object in the television program comprises information describing location of the user-selectable object in the television program.

14. The method of claim 1, wherein the received object information describing a user-selectable object in the television program comprises information identifying at least one action to be performed upon user-selection of the user-selectable object.

15. The method of claim 1, wherein the user-selectable object data set includes pointers that point to relative locations in the television program data set.

16. The television of claim 1, wherein the user-selectable object data set includes information regarding boundaries of the one or more user-selectable objects corresponding to the frame of the television program containing the one or more user-selectable objects.

17. A television system for communicating television program information, the television system comprising:
   at least one processor operable to, at least:
      determine user-selectable object information corresponding to one or more user-selectable objects in a television program;
      form a user-selectable object data set comprising the determined user-selectable object information, where the user-selectable object data set is independent of a television program data set generally representative of the television program, and wherein the user-selectable object data set includes information regarding boundaries of the one or more user-selectable objects corresponding to the frame of the television program containing the one or more user-selectable objects; and communicate the formed user-selectable object data set to one or more recipients.

18. The television system of claim 17, wherein said at least one processor is operable to communicate the formed user-selectable object data set to one or more recipients by, at least in part, operating to communicate the user-selectable object data set in one or more user-selectable object data streams independent of one or more television program data streams that generally communicate the television program data set.

19. The television system of claim 18, wherein said at least one processor is operable to communicate the formed user-selectable object data set to one or more recipients by, at least in part, operating to concurrently communicate the user-selectable object data set and the television program data set.

20. The television system of claim 19, wherein said at least one processor operates to concurrently communicate the user-selectable object data set and the television program data set on separate respective parallel communication channels.

21. The television system of claim 18, wherein said at least one processor is operable to communicate the formed user-selectable object data set to one or more recipients by, at least in part, operating to communicate the user-selectable object data set on at least one communication channel different from one or more communication channels over which the television program data set is communicated.

22. The television system of claim 18, wherein said at least one processor is operable to communicate the formed user-selectable object data set to one or more recipients by, at least in part, operating to communicate the user-selectable object data set over a first communication network that is different from a second communication network over which the television program data set is communicated.

23. The television system of claim 18, wherein said at least one processor is operable to communicate the formed user-selectable object data set to one or more recipients by, at least in part, operating to communicate the user-selectable object data set to a first set of one or more user local television systems, where the first set is a subset of a second set of user local television systems to which the television program data set is communicated.

24. The television system of claim 18, wherein said at least one processor is operable to communicate the formed user-selectable object data set to one or more recipients by, at least in part, operating to communicate the user-selectable object data set without regard for timing of communication of the television program data set.

25. The television system of claim 17, wherein said at least one processor is operable to form the user-selectable object data set by, at least in part, operating to:

determine linking information logically linking the user-selectable object data set to the television program data set; and incorporate the linking information into the user-selectable object data set.

26. The television system of claim 17, wherein said user-selectable object data set is a data file.

27. The television of claim 17, wherein the user-selectable object data set includes information describing a location of the one or more user-selectable objects in the frame relative to a previous location in a previous video frame.

28. A method for communicating television program information, the method comprising:

by the television system:

determining user-selectable object information corresponding to one or more user-selectable objects in a television program;

forming a user-selectable object data set comprising the determined user-selectable object information, the user-selectable object information including location information about the one or more user-selectable objects synchronized with a corresponding frame of the television program containing the one or more user-selectable objects, wherein the location information describes a location of the one or more user-selectable objects in a video frame relative to a previous location in a previous video frame, and wherein the user-selectable object data set is independent of a television program data set generally representative of the television program; and communicating the formed user-selectable object data set to one or more recipients.

29. The method of claim 28, wherein the user-selectable object data set comprises a multi-dimensional linked list with frames of the television program in a first dimension and user-selectable object records corresponding to each of the frames in a second dimension.

30. The method of claim 28, wherein the user-selectable object data set includes information regarding movement of the one or more user-selectable objects during each time segment.

* * * * *